United States Patent [19]
Jacob

[11] Patent Number: 5,146,265
[45] Date of Patent: Sep. 8, 1992

[54] APPARATUS AND METHOD FOR THE REPRODUCTION OF A COLORED MASTER

[75] Inventor: Friedrich Jacob, Munich, Fed. Rep. of Germany

[73] Assignee: Agfa-Gevaert Aktiengesellschaft, Leverkusen, Fed. Rep. of Germany

[21] Appl. No.: 733,097

[22] Filed: Jul. 19, 1991

[30] Foreign Application Priority Data

Aug. 13, 1990 [DE] Fed. Rep. of Germany ....... 4025625

[51] Int. Cl.$^5$ ...................... G03B 27/32; G03B 27/52
[52] U.S. Cl. ...................... 355/32; 355/35; 355/77
[58] Field of Search ...................... 355/20, 35, 38, 43, 355/45, 32, 77

[56] References Cited

U.S. PATENT DOCUMENTS 4,878,111 10/1989 Meyer ...................... 358/75
4,939,581 7/1990 Shalit ...................... 358/244

FOREIGN PATENT DOCUMENTS 2719821 8/1979 Fed. Rep. of Germany .
3307326 4/1988 Fed. Rep. of Germany .

*Primary Examiner*—Richard A. Wintercorn
*Attorney, Agent, or Firm*—Peter K. Kontler

[57] ABSTRACT

An apparatus for making copies of a colored master has a color monitor which can produce a color image of the master. The monitor is provided with a circuit for turning a portion of the monitor screen black-and-white and adjusting the size and/or position of the black-and-white portion of the screen. The black-and-white portion of the screen is positioned adjacent to a critical area of the color image so that the density and color of the image can be evaluated. The monitor further includes a circuit for adjusting the density and color of the image.

16 Claims, 1 Drawing Sheet

5,146,265

APPARATUS AND METHOD FOR THE REPRODUCTION OF A COLORED MASTER

BACKGROUND OF THE INVENTION

The invention relates to the reproduction of a master or original such as, for example, a frame of exposed and developed color film.

More particularly, the invention relates to adjustment of an image of a master preparatory to reproduction.

An apparatus for the reproduction of a colored master may include a color monitor which is used to produce a color image of the master. An operator can then correct the density and color of the image prior to making a reproduction of the master.

Apparatus of this type are used mainly by professional photographers to make prints of color negatives. The image on the monitor is evaluated by an operator who then adjusts the color filters and the exposure times. The color negatives are scanned by means of light and the resulting data stored in analog form or digital form. The image on the monitor is produced using these data.

The German Auslegeschrift 27 19 821 discloses an apparatus in which a monochromatic frame is generated on the monitor screen around the color image. The color of the frame is the same as the basic color of the printing or copy paper to permit appropriate visual comparison upon evaluation of the image. However, it has been found that a reference surface which surrounds the color image is not satisfactory. Thus, as an example, there is too large a spacing between the reference surface and a zone to be evaluated when such zone lies in the middle of the color image.

The German patent 33 07 326 teaches an apparatus where a second reference surface, which can be shifted across the screen, is provided in addition to the reference frame. The second reference surface can be placed directly adjacent to the critical zone to be evaluated. However, since only a single, predetermined reference color is again available, evaluation remains difficult.

SUMMARY OF THE INVENTION

It is an object of the invention to provide an apparatus which enables better evaluation of a color image on a monitor to be achieved.

Another object of the invention is to provide an apparatus for the reproduction of a master which allows the adjustment of color filter settings and exposure times to be simplified.

An additional object of the invention is to provide a method which makes it possible to better evaluate a color image on a monitor.

A further object of the invention is to provide a method for the reproduction of a master which permits color filter settings and exposure times to be adjusted relatively simply.

The preceding objects, as well as others which will become apparent as the description proceeds, are achieved by the invention.

One aspect of the invention resides in an apparatus for the reproduction of a master. The apparatus comprises a color monitor having a screen for forming a color image of the master, means for adjusting the image, e.g., for adjusting or correcting the density and/or color of the image, and means for making a portion of the screen black-and-white while the color image is exhibited on the screen.

By virtue of the invention, an operator has the opportunity to compare the colors with a neutral gray inside the image itself. A further advantage of the invention is that all required grays, and not only a single gray of one intensity, are present in the black-and-white portion of the screen or the black-and-white zone of the image.

In one embodiment of the apparatus, the means for making a portion of the screen black-and-white is designed to divide the screen into a colored half and a black-and-white half, i.e., to make one-half of the screen black-and-white, when the making means is activated. The monitor may comprise an operating console or panel and the means for making a portion of the screen black-and-white may, for instance, include a key or pad which can be manipulated by an operator and functions to turn one-half of the screen black-and-white. The screen may be divided in half along a dividing line which is preferably constituted by a horizontal or vertical central axis of the screen or by a diagonal of the screen.

According to an advantageous embodiment of the invention, the monitor further comprises means for moving the dividing line across the screen so that the operator can shift the dividing line. If, for example, the image to be evaluated includes a likeness of a person who is positioned in such a manner that the critical region of the face is not directly in the middle of the screen, the dividing line between the colored portion and black-and-white portion of the screen can then be shifted to the middle of the face. This allows the reference color to be located in the zone undergoing evaluation together with the actual color.

In accordance with another embodiment of the invention, the means for making a portion of the screen black-and-white is designed such that, upon activation of the making means, the black-and-white portion has a predetermined size and is centered on the screen. The monitor may here comprise means for enlarging and reducing the black-and-white portion so that the operator can expand and contract the black-and-white portion to any degree. The monitor may additionally comprise means for moving the black-and-white portion in order that the operator may here again bring the boundary between the colored portion and black-and-white portion of the screen directly into the critical zone.

The monitor may also comprise means for deactivating the making means in response to replacement of the master, i.e., the monitor may be designed so that, whenever the master is replaced, the screen automatically switches to a condition in which the entire screen is colored. This makes it possible to operate rapidly. If a black-and-white screen portion is required for each image, it is advantageous for the making means to include means for locating the black-and-white portion in a predetermined position on the screen in response to replacement of the master. Thus, whenever the master is replaced, the black-and-white portion is automatically shifted to the position it originally occupied upon insertion of the replaced master.

The apparatus in accordance with the invention is particularly well-suited for professional photography, e.g., portraits. Although the number of images is here not as large as in hobby photography, the copies produced by professional photographers must be of the highest quality. Hence, if an apparatus is available which assures that the first copy already has the desired quality, it would prove profitable to assign an operator to such apparatus.

Operators are likewise normally used to produce paper copies of diapositives. Accordingly, the invention can be applied here also.

The invention is not restricted to photography but can be used wherever the color quality of a master must be evaluated. By way of example, the invention can be employed in the printing industry.

Another aspect of the invention resides in a method of reproducing a master. The method comprises the steps of forming an image of the master so that a first portion of the image is colored and a second portion of the image is black-and-white, and adjusting the first portion of the image.

The step of adjusting the first portion of the image may involve changing or correcting the density and/or the color of the colored portion.

The colored and black-and-white portions of the image may be separated from one another by a dividing line and the method may then further comprise the step of moving the dividing line.

The method may also comprise the step of enlarging the black-and-white portion of the image or reducing the black-and-white portion.

In addition, the method may comprise the step of shifting the black-and-white portion of the image.

The novel features which are considered as characteristic of the invention are set forth in particular in the appended claims. The improved reproducing apparatus, however, both as to its construction and its mode of operation, as well as the improved reproducing method, will be best understood upon perusal of the following detailed description of certain specific embodiments when read in conjunction with the accompanying drawings.

DESCRIPTION OF THE PREFERRED EMBODIMENTS

Figure 1:
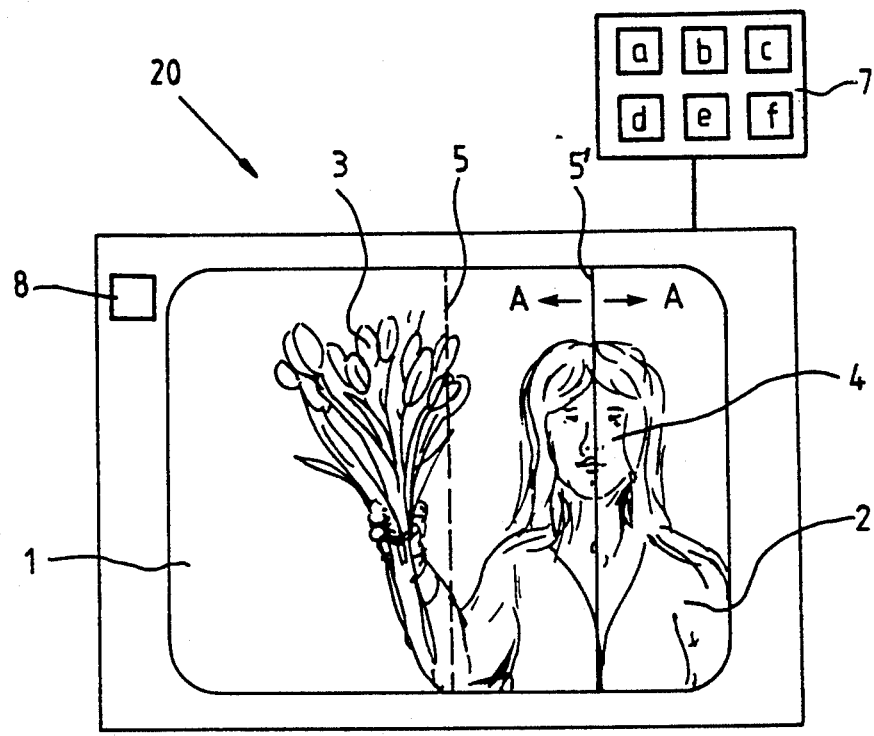
FIG. 1 shows a first embodiment of a monitor according to the invention constituting part of an apparatus for the reproduction of a master.

Referring to FIG. 1, an apparatus for the reproduction of a master includes a color monitor 20. The term "master" here encompasses any physical likeness or representation of a person, animal or thing on a sheet-like or strip-like carrier, or in the form of stored data. By way of example, the master may be color film, a color picture in the form of stored data or a copy of a color picture.

The monitor 20 has a color screen 1 which produces a color image of the master and the purpose of the monitor 20 is to permit evaluation of the color image, as well as adjustment of the density and/or the color of the image. The color image is here constituted by a woman 2 holding a bunch of flowers 3.

The monitor 20 includes a control panel or console 7 having a series of keys or pads "a", "b", "c", "d", "e" and "f". The function of the key "a" is to change or correct the density of the image 2,3; the function of the key "b" is to change or correct the color of the image 2,3; the function of the key "c" is to cause one-half of the screen 1 to become black-and-white so that the screen 1 is divided into a colored half and a black-and-white half along a vertical center line of the screen 1; the function of the key "d" is to cause one-half of the screen 1 to become black-and-white so that the screen 1 is divided into a colored half and a black-and-white half along a horizontal center line of the screen 1; the function of the key "e" is to cause one-half of the screen 1 to become black-and-white so that the screen 1 is divided into a colored half and a black-and-white half along a diagonal of the screen 1; and the function of the key "f" is to move the dividing line between the colored half and the black-and-white half of the screen 1 across the latter.

In order to evaluate the image 2,3, an operator actuates one of the keys "c", "d", "e" thereby causing one-half of the screen 1 to become black-and-white It is assumed here that the operator has actuated the key "c". Accordingly, the screen 1 is divided into a colored half and a black-and-white half along a the vertical center line 5 of the screen 1 shown in broken lines. In the present case, the monitor 20 is designed in such a manner that the portion of the screen 1 to the right of the dividing line 5 becomes black-and-white while the portion of the screen 1 to the left of the dividing line 5 remains colored.

By manipulating the key "f", the operator can move the dividing line 5 to the left or the right as indicated by the arrows A. Since, as is always the case in a color image of the type illustrated, the face 4 of the woman 2 constitutes the most critical area for evaluation, the operator now moves the dividing line 5 to the right so that the dividing line 5 is located in the critical area of the face 4. The shifted position of the dividing line 5 is shown by the unbroken line 5'.

Once the dividing line 5 has been shifted to the position 5', the operator evaluates the colored portion of the image 2,3, especially the colored portion of the face 4. If necessary, the operator adjusts the density and/or color of the colored portion of the image 2,3 using the key "a" and/or the key "b". The master being evaluated can thereupon be replaced with a new master to be evaluated.

Figure 2:
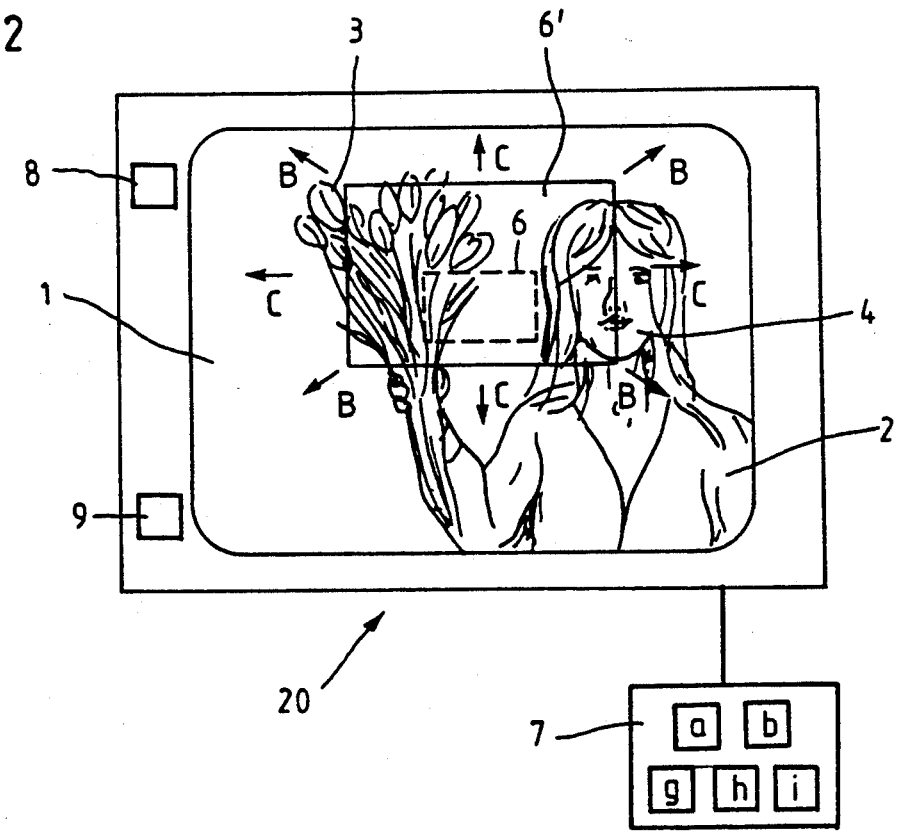
FIG. 2 illustrates a second embodiment of the monitor.

In FIG. 2, the same reference characters as in FIG. 1 have been used to identify similar elements. The monitor 20 of FIG. 2 again includes a control panel or console 7 having the keys or pads "a" and "b", as well as keys or pads "g", "h" and "i". The function of the key "g" is to cause a portion of the screen 1, which is centered on the latter, to become black-and-white; the function of the key "h" is to enlarge and contract the black-and-white portion of the screen 1; and the function of the key "i" is to move the black-and-white portion of the screen 1 across the screen 1.

To evaluate the image 2,3, the operator actuates the key "g". This causes a portion 6 of the screen 1 indicated in broken lines to become black-and-white. The monitor 20 is designed in such a manner that the black-and-white portion 6 of the screen 1 is centered on the latter. By manipulating the key "h", the operator can now zoom or enlarge the black-and-white portion 6 as shown by the arrows B. Similarly, by manipulating the key "i", the operator can move the black-and-white portion 6 across the screen 1 horizontally and/or vertically into the desired position as indicated by the arrows C. When the black-and-white portion 6 has been enlarged and shifted as required, the operator evaluates the image 2,3 with reference to the black-and-white portion 6. As illustrated by the showing in unbroken lines at 6', the black-and-white portion 6 is enlarged and shifted in such a manner in FIG. 2 that half of the flower bunch 3 and face 4 become black-and-white while half of the flower bunch 3 and face 4 remain colored. If necessary, the operator adjusts the density and/or color of the image 2,3 by means of the keys "a" and/or "b". The master being evaluated can then be replaced with a new master to be evaluated.

To increase output, the monitor 20 of the invention can be provided with a device 8 which automatically converts the black-and-white portion of the screen 1 to color upon replacement of a master.

It is also possible to provide the monitor 20 with a device 9 which automatically causes the black-and-white portion of the screen to assume a predetermined or starting position, such as that shown at 6 in FIG. 2, when a master is replaced with a new master.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. An apparatus for the reproduction of a master, comprising a color monitor having a screen for forming a color image of the master, means for adjusting the color image, and means for making a portion of said screen black-and-white while the color image is exhibited on said screen.

2. The apparatus of claim 1, wherein said adjusting means includes means for correcting the intensity of the image.

3. The apparatus of claim 1, wherein said adjusting means includes means for correcting the color of the image.

4. The apparatus of claim 1, wherein said screen has a diagonal and said making means includes means for dividing said screen into a colored half and a black-and-white half along said diagonal.

5. The apparatus of claim 1, wherein said screen has a horizontal center line and said making means includes means for dividing said screen into a colored half and a black-and-white half along said horizontal center line.

6. The apparatus of claim 1, wherein said screen has a vertical center line and said making means includes means for dividing said screen into a colored half and a black-and-white half along said vertical center line.

7. The apparatus of claim 1, wherein said making means includes means for dividing said screen into a colored portion and a black-and-white portion along a dividing line, said monitor further comprising means for moving the dividing line.

8. The apparatus of claim 1, wherein said making means includes means for centering said black-and-white portion on said screen.

9. The apparatus of claim 1, wherein said monitor further comprises means for enlarging said black-and-white portion.

10. The apparatus of claim 1, wherein said monitor further comprises means for shifting said black-and-white portion.

11. The apparatus of claim 1, wherein said monitor further comprises means for deactivating said making means in response to replacement of the master.

12. The apparatus of claim 1, wherein said monitor includes means for locating said black-and-white portion in a predetermined position on said screen in response to replacement of the master.

13. A method of reproducing a master, comprising the steps of forming an image of said master so that a first portion of said image is colored and a second portion of said image is black-and-white; and adjusting at least one of the intensity and color of said first portion.

14. The method of claim 13, wherein said first and second portions are separated from one another by a dividing line; and further comprising the step of moving said dividing line.

15. The method of claim 13, further comprising the step of enlarging said second portion.

16. The method of claim 13, further comprising the step of shifting said second portion.

* * * * *